(12) United States Patent
Yu et al.

(10) Patent No.: US 7,512,599 B2
(45) Date of Patent: Mar. 31, 2009

(54) QUERY DURATION TYPES

(75) Inventors: Qin Yu, San Mateo, CA (US); Adiel M. Yoaz, Foster City, CA (US); Subramanian Muralidhar, Fremont, CA (US); Visar Nimani, Redwood City, CA (US); Susan Kotsovolos, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 367 days.

(21) Appl. No.: 10/767,501

(22) Filed: Jan. 29, 2004

(65) Prior Publication Data

US 2005/0154714 A1    Jul. 14, 2005

Related U.S. Application Data

(60) Provisional application No. 60/536,652, filed on Jan. 13, 2004.

(51) Int. Cl.
    *G06F 7/00*       (2006.01)
    *G06F 17/30*      (2006.01)

(52) U.S. Cl. ............................... 707/4; 707/3; 707/102
(58) Field of Classification Search .................. 707/102
See application file for complete search history.

(56) References Cited

U.S. PATENT DOCUMENTS

| | | | | |
|---|---|---|---|---|
| 5,375,237 | A | * | 12/1994 | Tanaka et al. ............... 707/102 |
| 5,717,893 | A | | 2/1998 | Mattson |
| 5,832,498 | A | * | 11/1998 | Exertier ................... 707/103 R |
| 5,838,971 | A | | 11/1998 | Stadler et al. |
| 6,047,291 | A | | 4/2000 | Anderson et al. |
| 6,076,090 | A | * | 6/2000 | Burroughs et al. .......... 707/102 |
| 6,467,079 | B1 | | 10/2002 | Ettritch et al. |
| 6,584,459 | B1 | | 6/2003 | Chang et al. |
| 6,694,312 | B2 | | 2/2004 | Kobayashi et al. |
| 6,701,359 | B1 | | 3/2004 | Calabrez et al. |
| 6,748,388 | B1 | | 6/2004 | Kasamsetty et al. |
| 8,792,431 | | | 9/2004 | Tamboli et al. |
| 2003/0014617 | A1 | | 1/2003 | Tamboli et al. |
| 2003/0191769 | A1 | | 10/2003 | Crisan et al. |
| 2004/0230442 | A1 | | 11/2004 | Wookey |
| 2004/0230465 | A1 | | 11/2004 | Wookey |
| 2004/0230567 | A1 | | 11/2004 | Wookey |
| 2004/0230588 | A1 | | 11/2004 | Wookey |
| 2004/0230589 | A1 | | 11/2004 | Wookey |
| 2004/0230590 | A1 | | 11/2004 | Wookey et al. |
| 2004/0230591 | A1 | | 11/2004 | Wookey |
| 2004/0230603 | A1 | | 11/2004 | Wookey |
| 2004/0230605 | A1 | | 11/2004 | Tamboli et al. |
| 2004/0230667 | A1 | | 11/2004 | Wookey |
| 2004/0230818 | A1 | | 11/2004 | Wookey |
| 2004/0230891 | A1 | | 11/2004 | Wookey |
| 2004/0230982 | A1 | | 11/2004 | Wookey |
| 2005/0154715 | A1 | | 7/2005 | Yoaz et al. |

\* cited by examiner

*Primary Examiner*—Tony Mahmoudi
*Assistant Examiner*—Paul Kim
(74) *Attorney, Agent, or Firm*—Hickman Palermo Truong & Becker LLP

(57) ABSTRACT

A request to execute a query is received in a database system. In response, the database system determines that a collection of data elements to be returned by the query corresponds to a first data structure not defined within a type dictionary of the database system. The database system obtains attribute values that describe respective data fields within the first data structure, and records, within the type dictionary, a first data type definition that specifies the data fields described by the attribute values.

29 Claims, 6 Drawing Sheets

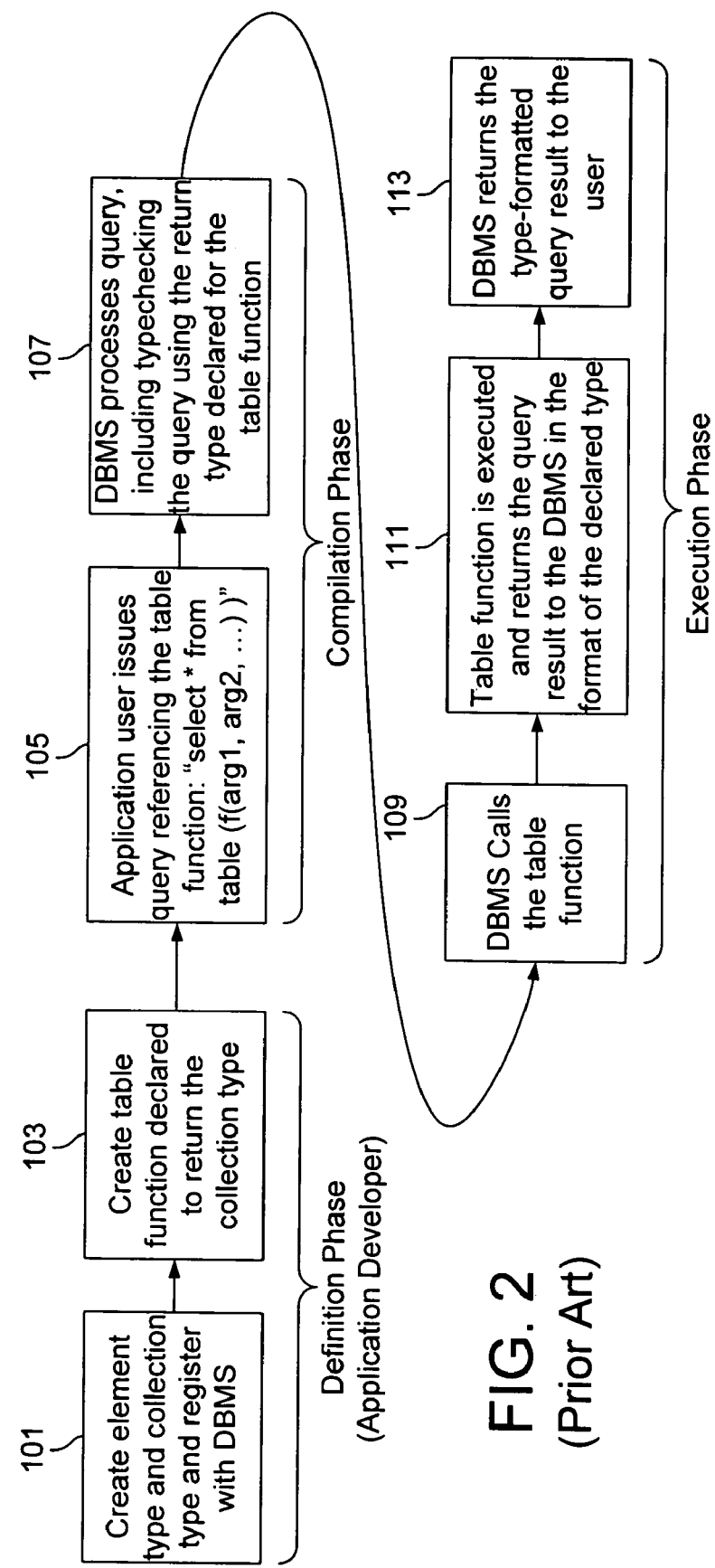

QUERY DURATION TYPES

CROSS-REFERENCE TO RELATED APPLICATIONS

This application claims priority from, and hereby incorporates by reference, U.S. Provisional Application No. 60/536,652, filed Jan. 13, 2004, and entitled "DYNAMIC RETURN TYPE GENERATION IN A DATABASE SYSTEM, QUERY DURATION TYPES."

FIELD OF THE INVENTION

The present invention relates generally to database management, and more particularly to query compilation and execution.

BACKGROUND

Data in a relational database are typically organized in logical, row-column storage structures called tables. The data stored within each row of a table collectively form a storage record ("record" for short) with the columns of the table defining respective storage fields within the records. Thus, tables may be viewed as arrays of records, with each record being a multi-field data structure. Referring to the simple prior art table shown in FIG. 1, for example, the table designated 'Table1' is a two-deep array of records in which each record includes an employee number field and an employee name field.

Most modern database management systems (DBMS) provide a structured query language (SQL) interface to allow users to define, access and manipulate data within the DBMS. For example, a typical SQL interface may be used to define Table1 as follows ('number' and 'varchar2' are primitive types for numeric and character data, respectively):

SQL> create table Table1 ( EmpNo number, EmpName varchar2(30));
Table created.
SQL> insert into Table1 values (123, 'Johnson');
1 row created.
SQL> insert into Table1 values (124, 'Scott');
1 row created.

As Table1 has been created and populated with two records, the SQL interface may now be used to query Table1 as follows:

| SQL> select * from Table1; | |
|---|---|
| EmpNo | EmpName |
| 123 | Johnson |
| 124 | Scott |

Some modern database systems permit definition and execution of specialized functions called table functions which return collections of data much like a table query operation. As a simple example, a table function that returns static data corresponding to the query result above may be defined using the SQL interface as follows:

SQL> create type employee_t as object ( EmpNo number, EmpName varchar2(30));
Type created.
SQL> create type employee_coll as table of employee_t;
Type created.
SQL> create function Tfx(DataSource varchar2) return employee_coll is
2 begin
3 return employee_coll (employee_t (123, 'Johnson'), employee_t (124 'Scott'));
4 end;
Function created.

The SQL interface may now be used to execute table function Tfx as follows

| SQL> select * from table (Tfx(' ')); | |
|---|---|
| EmpNo | EmpName |
| 123 | Johnson |
| 124 | Scott |

Note that in this simple example, the function argument 'DataSource' is not referenced within the body of the table function so that the value of the input parameter (a space in this example) does not affect the function output.

FIG. 2 illustrates the definition, compilation and execution of a table function in a prior-art DBMS. Herein the term function is used to mean a sequence of instructions that may be executed by a processor and includes, without limitation, procedures, methods, subroutines and other expressions describing such sequences of instructions. At block 101 of the definition phase, a database application developer (i.e., one who develops database applications typically using various programming interfaces and tools provided in a commercially available DBMS) creates an element type and collection type and registers the types with the DBMS. The element type defines the fields within individual records returned by the table function, and the collection type is an array of element types. Referring to the table function, Tfx, defined above, for example, the SQL interface is used to create an element type, employee_t, that defines the fields (EmpNo and EmpName) within each record returned by the table function, and a collection type, employee_coll, that defines an array of employee_t data elements. At block 103 of the definition phase, the application developer creates a table function declared to return the collection type. In block 105 of the compilation phase, an application user issues a query referencing the table function. In the example shown above and in block 105, the wildcard operator '*' is used to select all fields of the element type to be returned by the table function. Also, as shown in block 105, the argument list of the table function may include one or more arguments (i.e., arg1, arg2, . . . ). At block 107 of the compilation phase, the DBMS processes the query, including type-checking the query using the return type declared for the table function. By this operation, the DBMS ensures that the data returned by the table function will be in a pre-defined format that can be returned to the user, avoiding type inconsistencies and other errors that often generate exceptions and errors in data processing systems. At block 109, the execution phase of the query is begun when the DBMS calls the table function, providing the arguments supplied by the user in block 105. The table function is executed in block 111 and returns the query result to the DBMS in the format of the type declared in the definition phase (i.e., at block 103). The DBMS, in turn, returns the type-formatted query result to the user at block 113, concluding the query execution.

Reflecting on the query definition, compilation and execution phases illustrated in FIG. 2 and the example above, it should be noted that table functions are often used to fetch and process information from remote data sources or external data sources which have a proprietary non-SQL query interface, such as databases accessible over computer networks (e.g., the world-wide packet data communication network now commonly referred to as the Internet or similar, private packet data communication networks sometimes referred to as intranets). Thus, while a simple example having a static data definition is set forth above, the actual organization and type of data stored in the remote data source may vary from data source to data source. One approach to accommodating such varying data source organizations is to create different data types (element types and collection types) and table functions according to the nature of the different data sources from which data is to be fetched. As there may be hundreds, thousands or more of such data sources, each to be processed in a similar manner (e.g., return all data) but having different organizations and/or data types, creating dedicated data types and functions for each data source is often impractical. Worse, in many cases the organization and type of data stored in the remote data source may not be known in advance (e.g., as in a database application programmed to seek out data sources over the Internet and return contents according to user-specified selection criteria) so that advance creation of dedicated data types and functions is not feasible. Another solution to handling a wide variety of data source organizations and data types is to define an opaque container type that can store any type of query result. One example of such an opaque container type is a binary large object ("blob"), which may be used to store an aggregation of multiple component values of a record. That is, all the component fields within a given record are combined in non-delimited form within a blob, with the table function being declared to return a collection of blobs. While the opaque container solution generally allows for retrieval of data in numerous organizations and types, the aggregation of component values within a blob represents a loss of information that the DBMS generally cannot recover. That is, the DBMS typically cannot unpack the blob into row-column format as no information about the formatting of fields within the blob is provided. Consequently, the user (or application developer) is typically left to convert the array of blobs into a readable format (i.e., assuming that conversion information is available), a generally inefficient and inconvenient operation for most users.

BRIEF DESCRIPTION OF THE DRAWINGS

The features and advantages of the present invention are illustrated by way of example, and not by way of limitation, in the figures of the accompanying drawings and in which like reference numerals refer to similar elements and in which FIG. 1 illustrates a table in a prior-art database system;

FIG. 2 illustrates the definition, compilation and execution of a table function in a prior-art database management system;

DETAILED DESCRIPTION

Figure 3:
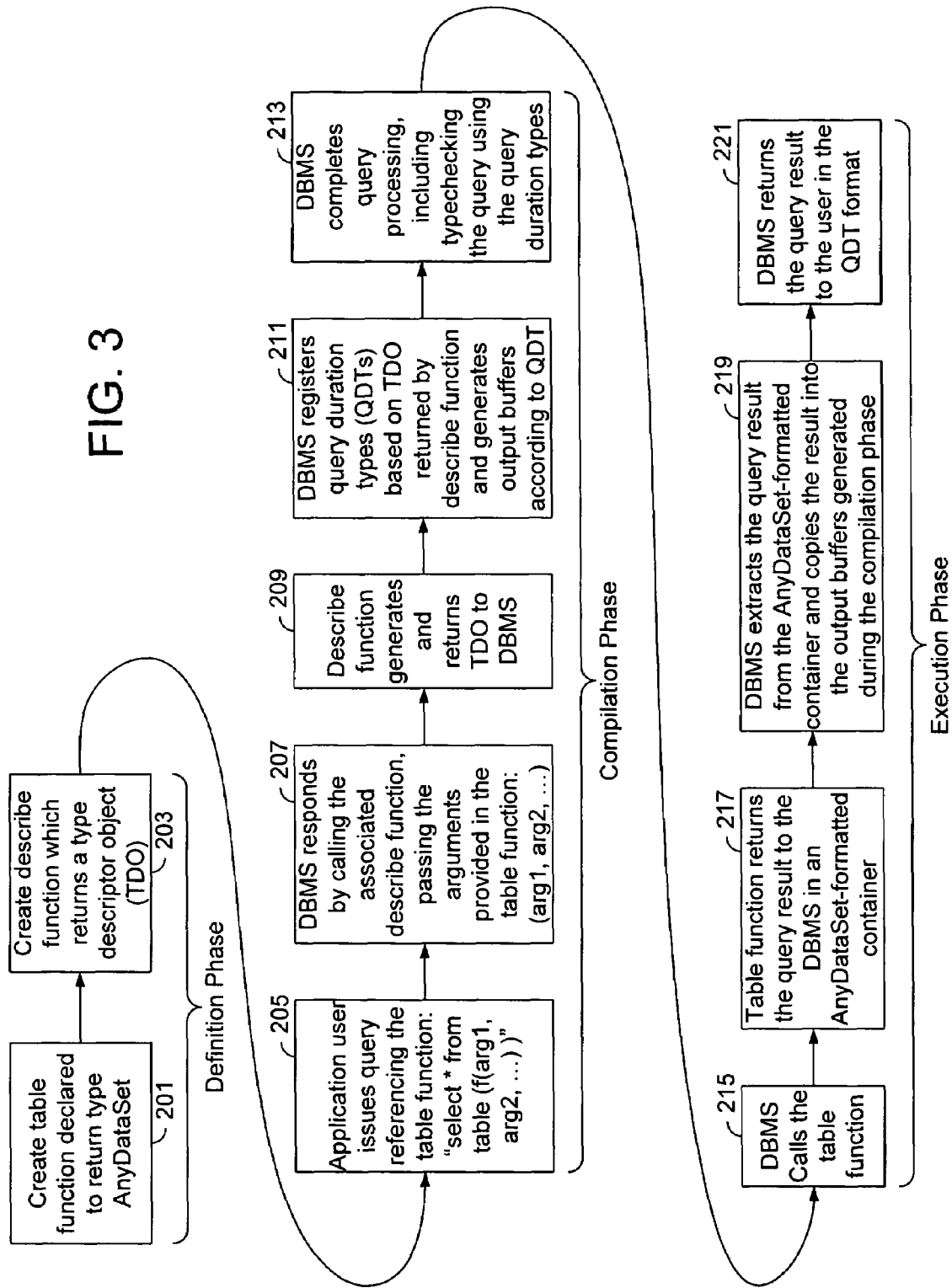
FIG. 3 illustrates the definition, compilation and execution phases of a table function according to an embodiment of the invention.

In embodiments of the present invention a function, referred to herein as a describe function, is created by an application developer during the definition phase of a table function and associated with the table function. When a query that references the table function is compiled, the associated describe function is executed to determine the organization and type of data to be fetched from a data source. The organization and type information is used during query compilation to create and register temporary data types, referred to herein as query duration types (QDTs) that reflect the data elements and collections of data elements to be fetched. Once registered, the query duration types may be used by a database management system (DBMS) to type-check the query during the query compilation and to organize data returned in an opaque container into component values during query execution, thereby enabling the DBMS to return the query result in a row-column format according to the organization and type of the fetched data. Thus, by invoking a describe function to learn the organization and type of data to be fetched and processed by a table function, then dynamically creating corresponding data types, a single table function may be used to access data sources having a wide variety of content and organizations, and to deliver the data in a format that preserves the organization information present in the data sources.

In one embodiment, a predetermined opaque container type is specified in the declaration of a table function to signal the DBMS that a describe function is associated with the table function. Upon receiving a query that invokes a table function declared to return the predetermined opaque container type, the DBMS calls the associated describe function, passing to the describe function the same arguments (or at least a subset thereof) provided in the table function invocation. When executed, the describe function queries a data source indicated by the input arguments to determine the organization and type of data to be returned by the table function, and returns the organization and type information to the DBMS for use during query compilation and execution.

In another aspect of the invention, the DBMS generates query duration types by inspecting an attribute list, referred to herein as a type descriptor object (TDO), returned by the describe function to determine whether the TDO includes an attribute that itself is a TDO (i.e., the list of attributes includes a nested list of attributes). Each such nested TDO is inspected in a recursive manner to reach a final TDO that includes no nested TDOs, such final TDO being referred to herein as a leaf TDO in a TDO tree. A query duration type is created and registered in a data type dictionary for each TDO in the tree, starting with the leaf TDOs and then proceeding recursively to each encompassing TDO. The query duration types are then used for type-checking during query compilation and for formatting the return data during query execution. In one embodiment, each query duration type generated in response to a given query is deleted from a data type dictionary when execution of the query is complete (i.e., when the query results are returned to the individual or entity that issued the query). In an alternative embodiment, query duration types are deleted from the type dictionary upon when a compilation of the corresponding query (and all other query compilations that reference the query duration types) are deleted, overwritten or otherwise expelled from system memory. In an alternative embodiment, each data type registered in the data type dictionary includes a flag to indicate whether the data type is a query duration type. A process is executed periodically (or in response to selected events) to identify query duration types registered in the data type dictionary (i.e. through inspection of the flag) and to delete those query duration types for which execution of all queries referencing the query duration types is complete, or for which compilations of all queries referencing the query duration types have been expelled from memory.

FIG. 3 illustrates the definition, compilation and execution phases of a table function according to an embodiment of the invention. At block 201 of the definition phase, a table function is created and declared to return a predetermined opaque container type, 'AnyDataSet.' In one embodiment, the AnyDataSet type is a collection of binary large objects ("blobs") having generally the same characteristics as other collections of blobs (i.e., an opaque container type), except that the term 'AnyDataSet' is a keyword that signals the DBMS that the table function has an associated describe function. Accordingly, at block 203 of the definition phase, a describe function is created and declared to return a TDO having one or more constituent attribute lists, each attribute in a given list including an attribute name component and an attribute type component. In one embodiment, the describe function is declared to receive the same list of arguments as the table function. For example, using a standard SQL interface (e.g., according to SQL standards established by the American National Standards Institute (ANSI SQL)), the table function and describe function may be created as follows:

```
SQL> create function fx ( arg1 arg1type, arg2 arg2type, . . . ) return
AnyDataSet is
2     begin
3 to N-2    {function body: data retrieval and processing operations}
N-1         return AnyDataSet;
N      end;
       Function created.
SQL> create function describe_fx (arg1 arg1type, arg2 arg2type, . . . )
return TDO
2     begin
3 to M-2    {metadata retrieval and processing operations}
M-1         return TDO;
M      end;
``` is

Note that while the table function, 'fx', retrieves data from the remote data source specified by the argument list (or in the body of the table function) and processes the data, the describe function, 'describe_fx', retrieves metadata that describes the organization and type of data in the data source. For example, in one embodiment, the data source may be a remote or local database table for which metadata can be obtained using a catalog view (i.e., a view of the column names and types within a database table). More specifically, assuming that a catalog view of the data source, CatalogView, exists in the system containing the data source, the following SQL command may be issued within the describe function to obtain metadata for the table in FIG. 1:

| SQL> select ColName, ColType from CatalogView where TabName = 'Table1' ||
|---|---|
| ColName | ColType |
| EmpNo | number |
| EmpName | string |

More generally, any programming interface that includes functions (including procedures, methods or other sequences of executable instructions) that may be invoked to determine the organization and type of data within a data source (i.e., obtain the metadata for the data source) may be called by the describe function. Once obtained, the metadata is used within the describe function to populate the TDO.

Still referring to FIG. 3, at block 205 of the compilation phase, an application user issues a query referencing the table function and specifying arguments to be passed to the table function during function execution. At block 207, the DBMS responds to the query by calling the describe function associated with the table function. Note that the describe function may be associated with the table function in any number of ways. In one embodiment, for example, the describe function and table function are both methods within the same object (i.e., a construct in an object-oriented programming language in which public and private methods are used to access and manipulate data encapsulated within the object) so that the table function is invoked by reference to 'ObjectName.TableFx (argument list)', and the associated describe function is invoked by reference to 'ObjectName.DescribeFx (argument list)'. In an alternative embodiment, the table function may explicitly or implicitly reference the describe function (or vice-versa) so that the DBMS is informed of the association during the definition phase. In an alternative embodiment, the sequence of function creations may be used to associate a table function and describe function (e.g., creation of a table function declared to return AnyDataSet triggers the DBMS to associate the next-created function with the table function). More generally, any technique for associating the table function and describe function may be used without departing from the scope of the present invention.

At block 209 of the compilation phase, the describe function, when executed, queries the data source specified in the argument list (or in the body of the describe function) to obtain the metadata for the data source, then generates a corresponding TDO (i.e., a list of attributes indicated by the metadata) and returns the TDO to the DBMS. As discussed below, the TDO may include any number of nested TDOs depending on the organization and content of the data source. At block 211, the DBMS generates and registers one or more query duration types in a data type dictionary based on the TDO returned by the describe function and generates output buffers according to the query duration types. As an example, the TDO returned by a describe function that queries the metadata for the table of FIG. 1 will include a root TDO that specifies a collection of type Employee_t, and a nested, leaf TDO for the type Employee_t that lists attribute names, EmpNo and EmpName, and corresponding attribute types, number and string, respectively. The attribute names and types collectively define fields (or attributes) within the larger Employee_t data element. At block 213, the DBMS completes query processing (e.g., completing any unfinished parsing and semantic analysis), including type-checking any table function output references in the query against the query duration types registered in block 211.

Execution of the query begins at block 215 when the DBMS calls (i.e., invokes or otherwise initiates execution of) the table function, passing the arguments specified in the query issuance at block 205. At block 217, the table function (or the executed instance thereof) returns a query result to the DBMS in an AnyDataSet-formatted container. That is, the DBMS receives an opaque container in the form of an array of blobs. At block 219, the DBMS extracts the query result from the AnyDataSet-formatted container according to the query duration types registered during the compilation phase, in effect parsing each blob according to the field mapping indicated by the query duration types, and copies the extracted, field-mapped components of each blob into the output buffers generated at block 211 of the compilation phase. As an example, a blob returned for a row of Table1 would include an aggregation of the values of the row (i.e., a single aggregate value containing an employee number and name) onto which the fields of type Employee_t are mapped to enable extraction of the constituent employee number (EmpNo) and employee name (EmpName) values. (In an alternative embodiment, the list of attributes in the TDO returned by the describe function may themselves be used to extract the fields in the opaque container without referencing the query duration types.) At block 221, the DBMS returns the query result to the user in the format specified by the query duration types (i.e., formatted by fields). In one embodiment, the operations at blocks 219 and 221 are performed on a row-by-row basis (i.e., iteratively), with each blob of the AnyDataSet-formatted container being parsed according to the field information specified by the query duration type, copied into a row buffer (containing sub-buffers for each field indicated by the query duration type) and returned to the user before the next blob is parsed. Alternatively, all the blobs may be parsed and constituent values therein copied into respective row buffers before the query result is returned to the user at block 221.

Reflecting on FIG. 3, it should be noted that the use of a describe function to dynamically determine the structure of a returned data type is not limited to table functions, and may potentially be used to determine the return type for any function including, without limitation, user-defined functions (i.e., functions provided by a system user or application developer), system-defined functions, functions obtained from remote systems and so forth.

Figure 4:
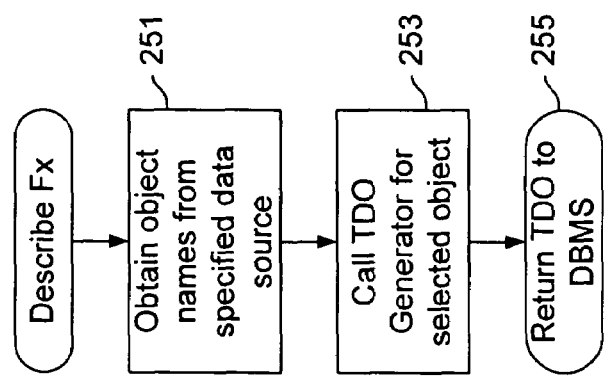
FIG. 4 is a flow diagram illustrating execution of a describe function according to an embodiment of the invention.

FIG. 4 is a flow diagram illustrating execution of a describe function according to an embodiment of the invention. At block 251, the describe function accesses a specified data source to obtain a set of object names. As discussed above, the data source may be specified in an input argument list or by execution of the body of the describe function (e.g., the describe function and table function may each call one or more other functions to determine the identity and/or location of the data source). The data source may be specified, for example, by a uniform resource locator that indicates a data entity and location on a network of computer systems or network of computer networks (e.g., an intranet or portions of the Internet accessible via hyper-text transfer protocol (commonly referred to as the world-wide-web), file transfer protocol, or other protocols). Alternatively, the data source may be specified by selection criterion, by name or any other technique that enables the describe function (and the associated table function) to identify the data source. The data source itself may be a table, collection of tables, or any other data entity that may be inspected by the describe function to obtain organization and type information.

At block 253, a function referred to herein as a TDO generator is called, passing a pointer to a selected object within the data source (e.g., a pointer to the entire data source, or a portion thereof such as one of a plurality of constituent tables within the data source), the selected object being indicated, for example, by the arguments passed to the describe function (and to the table function), or by execution of the body of the describe function. As discussed below, the TDO generator is executed recursively, calling itself for each nested attribute list detected within the selected object, and ultimately returns a TDO (i.e., by reference or by value) to the describe function. At block 255, execution of the describe function is concluded by returning the TDO to the DBMS.

Figure 5:
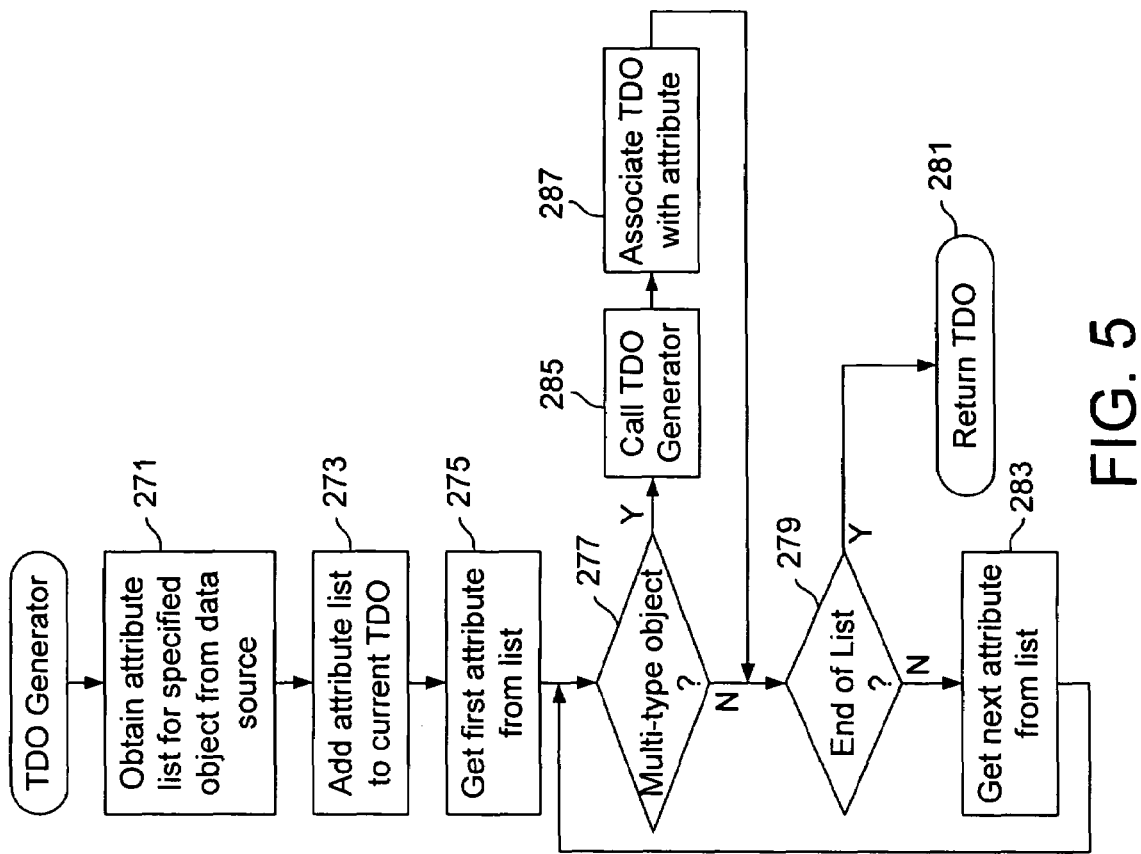
FIG. 5 is a flow diagram illustrating execution of a TDO (type descriptor object) generator function according to an embodiment of the invention.

FIG. 5 is a flow diagram illustrating execution of a TDO generator function according to an embodiment of the invention. At block 271, an attribute list is obtained for a specified object within the data source (i.e., the object specified in the TDO generator call issued during execution of a describe function or by another executing instance of the TDO generator). The attribute list may be obtained in any number of ways including, without limitation issuing a query to the data source requesting column name and type information (e.g., a catalog-view query as discussed above). More generally, the describe function author (e.g., the database application developer) may apply any desired logic to determine which attributes are to be included in the attribute list. For example, the describe function, when executed, may process an initial attribute list obtained in block 271 to remove attributes that are not needed in the database application. The attribute list, including column names and column data types, is added to a data structure for the TDO being constructed in block 273. At block 275, the first attribute in the list is obtained from the TDO under construction. If, at decision block 275, the attribute is determined to have a data type that indicates a multi-type object (e.g., an array, or other multi-element data structure), then the attribute is deemed to encompass a nested list of attributes and the TDO generator calls itself at block 285 to generate a TDO for the nested attribute list. By recursively calling itself in this manner, additional executions of the TDO generator are initiated for each nested attribute list until construction of a TDO having no nested attribute lists is completed, such TDO constituting a leaf node in a TDO tree. After a recursive call to the TDO generator at block 285 returns, the returned TDO is associated with the attribute being processed in the calling TDO generator at block 287 and thereby becomes a nested TDO within the TDO under construction in the calling TDO generator. The nested TDO may be associated with an attribute of an encompassing TDO, for example, by recording a pointer to the nested TDO in the attribute name field and a pointer type in the attribute type field of the encompassing TDO. Other techniques for associating the nested TDO with an encompassing TDO may be used in alternative embodiments. If, at decision block 279, the attribute obtained at block 275 is determined not to be the last in the attribute list, the next attribute is obtained from the attribute list in block 283, and the execution of the TDO generator returns to decision block 277. Thus, each attribute in the attribute list is inspected to determine whether the attribute corresponds to a nested list of attributes and, if so, the TDO generator is executed recursively to generate a corresponding nested TDO. Through such recursive execution, the TDO generator, in effect, follows each branch of the TDO tree until TDOs are generated for all leaf nodes, then progresses back towards the root node of the TDO tree (i.e., the TDO being constructed in response to the initial invocation of the TDO generator), completing construction of TDOs for branch nodes (i.e., nested TDOs themselves having one or more nested TDOs) and then for the root node.

Figure 6A:
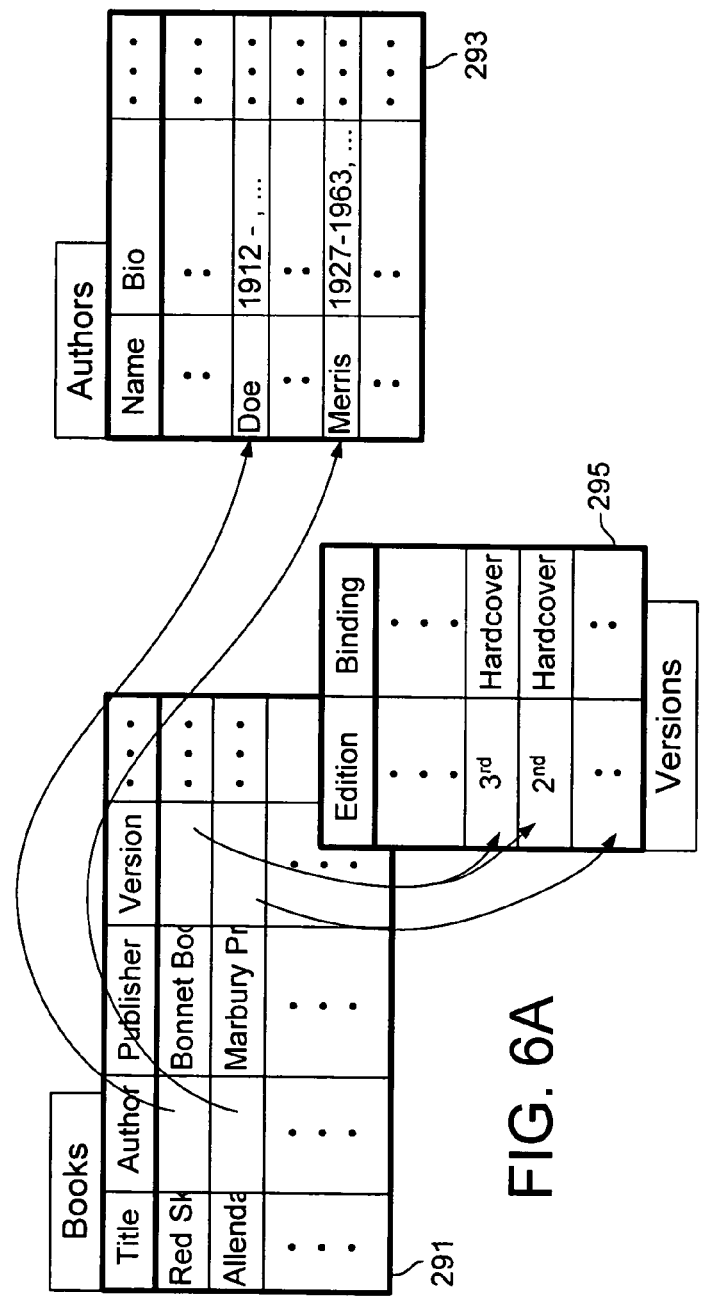
FIGS. 6A and 6B illustrate the generation of a nested set of TDOs for an exemplary data source.
Figure 6B:
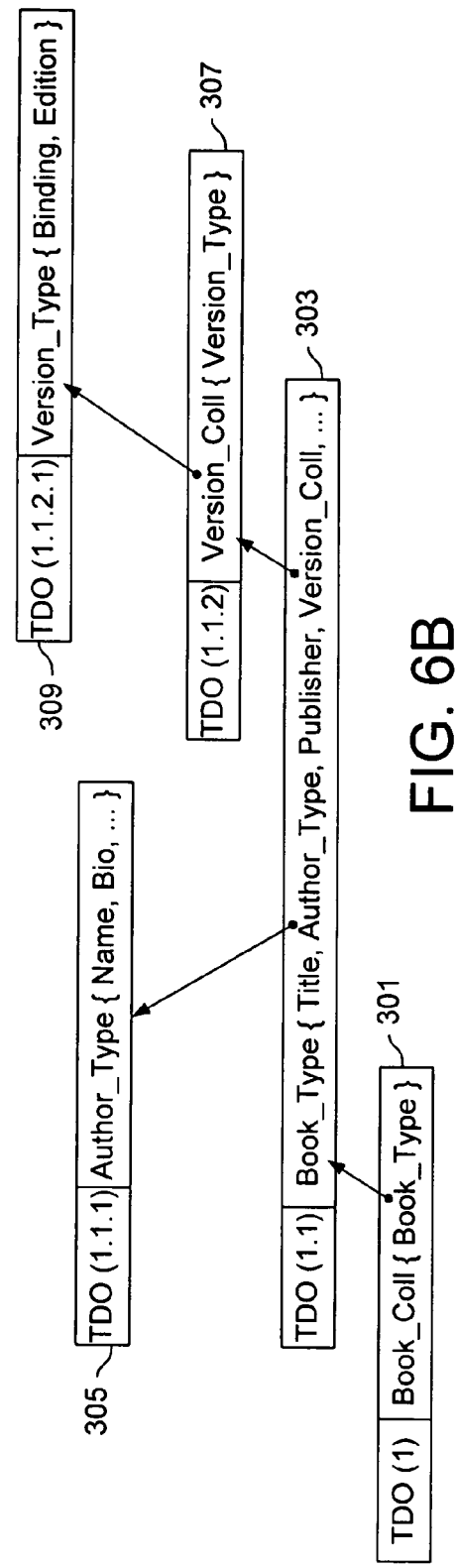

FIGS. 6A and 6B illustrate the generation of a nested set of TDOs for an exemplary data source. Referring to FIG. 6A, the data source includes a Books table 291, Authors table 293 and Versions table 295. The Books table 291 includes title, author, publisher and version columns, with the data entry in the author column including a reference to a record in the Authors table 293, and the data entry in the version column including a reference to one or more entries the Versions table 295. Thus, in response to a query directed to retrieve book, author and version information, a describe function is called to generate TDOs that describe the organization and type information in the Books, Authors and Versions tables. Referring to FIG. 6B, the describe function initially invokes the TDO generator function described in reference to FIG. 5, which begins construction of a TDO (1) 301 describing a collection of books. As the collection of books itself includes a list of attributes (corresponding to the fields of the Books table 291), the initial invocation of the TDO generator invokes a second instance of the TDO generator to construct a branch TDO (1.1) 303 that lists the names and types of columns in the Books table (i.e., a list of attributes for the Books table). Upon inspecting the attribute list, the second instance of the TDO generator determines that the author field itself contains a nested list of attributes and invokes a third instance of the TDO generator to construct a TDO (1.1.1) 305 that lists the names and types of columns in the Authors table 293. In this example, none of the name and type attributes for the Authors table 293 contains a nested list of attributes, so that TDO 305 constitutes a leaf TDO. Accordingly, after execution of the third TDO generator instance is completed (completing generation of TDO 305), execution of the second TDO generator is resumed, enabling inspection of the remaining attributes of the Books table 291. As the versions field also constitutes a list of attributes (a collection of versions), a fourth instance of the TDO generator is invoked to construct a TDO (1.1.2) 307 for the version collection. The version collection itself includes a list of attributes (edition and binding), so that the fourth instance of the TDO generator invokes a fifth instance of the TDO generator to construct a TDO (1.1.2.1) 309 that lists the attributes of the type. Because none of the attributes of the version type themselves constitute lists of attributes, the TDO 309 constitutes a leaf TDO which, after completion, enables execution of the fourth instance of the TDO generator to complete, which enables execution of the second instance of the TDO generator to complete, which, lastly, enables execution of the first instance of the TDO generator to complete. After execution of the first TDO generator is complete, the root TDO 301 constructed by the first TDO generator (or a pointer or other reference thereto) is returned to the describe function. As discussed in reference to blocks 209 and 211 of FIG. 3, after the TDO 301 is returned to the describe function, the describe function provides the TDO 301 to the DBMS which, in turn, invokes a QDT generator function to create and register query duration types that correspond to the TDO 301 and the nested TDOs thereof, and to complete type-checking of the query according to the query duration types.

Figure 7:
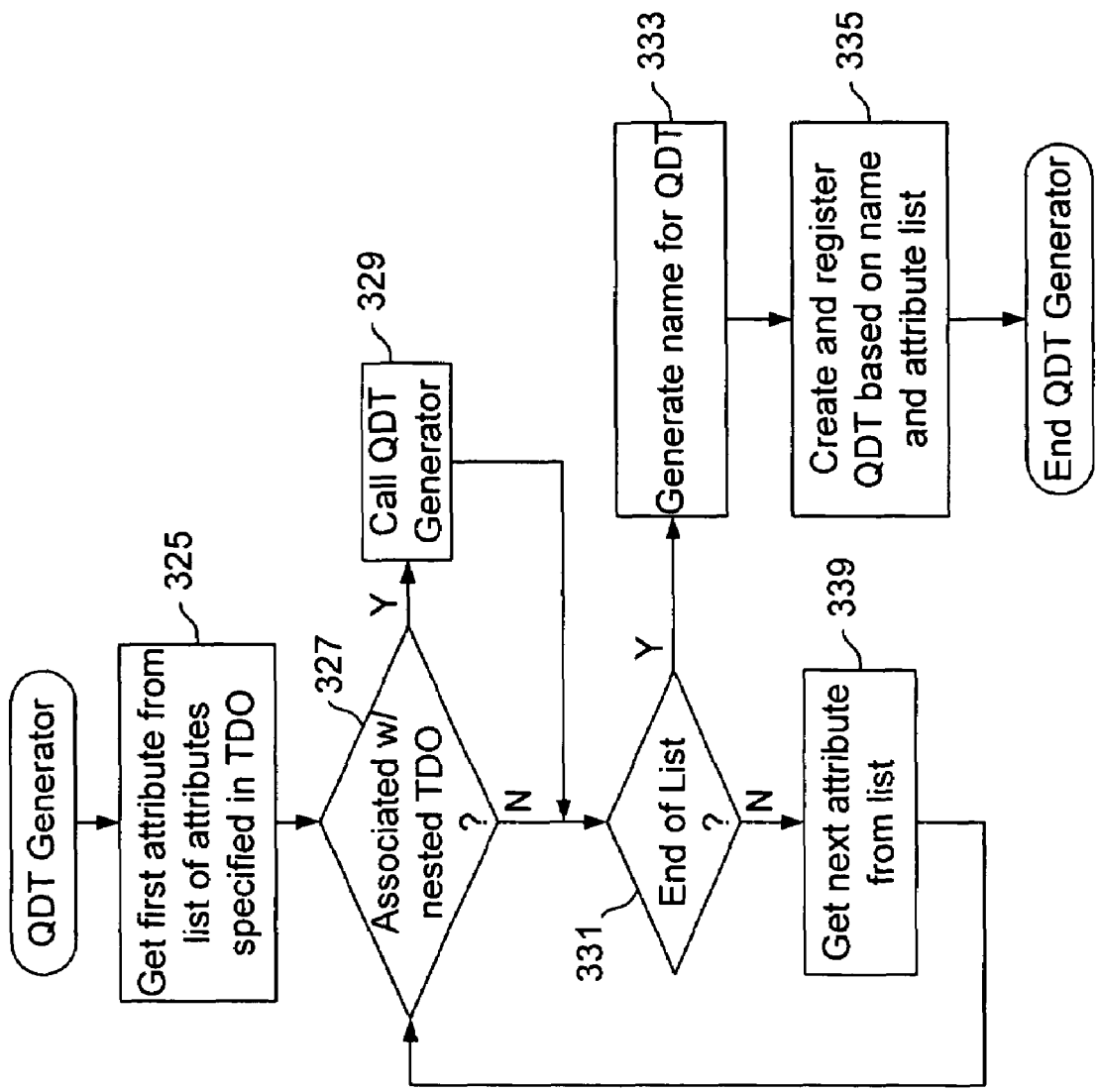
FIG. 7 is a flow diagram illustrating execution of a QDT (query duration type) generator function according to an embodiment of the invention.

FIG. 7 is a flow diagram illustrating execution of a QDT generator function according to an embodiment of the invention. At block 325, a first attribute is obtained from a list of attributes specified in a DBMS-supplied TDO. The TDO may be passed by reference or value as an input parameter to the QDT generator. At block 327, the attribute obtained in block 325 is inspected to determine whether it is associated with (e.g., references) a nested TDO. If so, the QDT generator calls itself at block 329 to enable recursive processing of nested TDOs. If the attribute is determined not to be associated with a nested TDO (and when the recursive TDO generator call at 329 returns) the attribute list is inspected at block 331 to determine whether the end of the attribute list has been reached. If not, the next attribute is obtained from the attribute list and execution returns to decision block 327. If the end of the attribute list has been reached, then all nested query duration types have been processed, and a name is generated for the current query duration type at block 333. In one embodiment, the name is automatically generated by requesting a unique identifier from the DBMS or other system resource (e.g., operating system function). The identifier may be a number that is incremented by the DBMS after each identifier is issued (thus resulting in an ascending identifier sequence), a time stamp or any other value that may be ensured not to be identical to a previously issued identifier. A prefix may be added to the identifier to complete the name of the query duration type, and to indicate that the type has been automatically created. Thus, the naming convention may be used to identify query duration types and distinguish them from user-created types or other more permanent DBMS types. Alternatively, as discussed below, all data types registered with the DBMS may include a flag (or other attribute) that is set or reset to indicate whether the type is a query duration type. At block 335, the query duration type is created based on the attribute list in the corresponding TDO, and registered in the DBMS. In one embodiment, registration in the DBMS is accomplished by storage of the type or a reference to the type in a type dictionary maintained by the DBMS. Execution of the QDT generator is completed at block 335 and control returns to the caller, which may be the DBMS or, in the case of a nested query duration type, another instance of the QDT generator. Thus, when the initial instance of the QDT generator reaches block 333, all data types included within the top level query duration type have been created and registered. Upon completion of the initially called instance of the QDT generator (i.e., the instance invoked by the DBMS), all the query duration types indicated by the TDO returned by the describe function have been created and registered. As discussed above in reference to FIG. 3, output buffers are generated for the query duration type during query compilation, including storage allocation for each data component of the query duration type. The query duration types may be used to type-check the user-issued query as discussed in reference to block 213 of FIG. 3, and generate the output buffers used during query execution to store data to be returned to the user in the format of the query duration type.

In an alternative embodiment of a QDT generator, a query duration type may be generated based on the output format of an arbitrary query (the output format of a query is the list of query output elements and their types, and is based on the expressions in the select list of the query). Such query duration types are useful when the output of a query needs to be packaged into a typed array, in which case a query duration type that corresponds to the output format of a query is created, as well as an array query duration type having array elements in the output format query duration type. The DBMS determines the output format of a query during the compilation phase (i.e., during type-checking) so that the compiled query includes all the information required to construct a query duration type based on the output format of the query. Query duration types generated in this manner have attributes that correspond to the elements in the query output. In one embodiment, the QDT generator receives a handle (or pointer) to a query compilation instance (i.e., one or more data structures representing a compiled query), and constructs a query duration type by scanning the lists of output elements in the query output format, and adding an attribute to the query duration type for each output element. The type of each attribute in the query duration type is the same as the type of the corresponding output element.

In one embodiment, a dependency data structure is generated during the compilation of a query to maintain a list of objects on which the query depends, including any query duration types created during the query compilation. In one embodiment, query compilation instances are maintained in an aging queue, with the least recently executed query compilation instance occupying the head of the queue. When a new query compilation is inserted into the queue, the least recently executed query compilation instances is expelled from the queue, in effect purging the query compilation instance from memory. Such expelled query compilation instance is referred to as being "aged out" of the system. In one embodiment, when a query compilation instance is aged out of the system, the data dependency structure for the query is inspected to identify query duration types on which the query depends. If the query duration types are not referenced (i.e., included in the data dependency structures) by other query compilation instances in the aging queue, the query duration types are deleted from the type dictionary or marked for deletion. In the case of query duration types marked for deletion, a background process periodically inspects objects maintained in system memory and deletes marked query duration types from the type dictionary. In an alternative embodiment, query duration types are deleted from the type dictionary when a compilation of the corresponding query (and all other query compilations that reference the query duration types) are deleted, overwritten or otherwise expelled from system memory. In another alternative embodiment, each data type registered in the data type dictionary includes a flag to indicate whether the data type is a query duration type. A process is executed periodically (or in response to selected events) to identify query duration types registered in the data type dictionary (i.e. through inspection of the flag) and to delete those query duration types for which execution of all queries referencing the query duration types are complete, or for which compilations of all queries referencing the query duration types have been expelled from memory.

Operational Context

The embodiments described above may be implemented in a programmed general-purpose or special-purpose computer system or in a network of computer systems. Alternatively, the embodiments may be implemented in a device that includes hardwired logic for carrying out the above-described operations, or any combination of programmed processors and hardwired logic.

Figure 8:
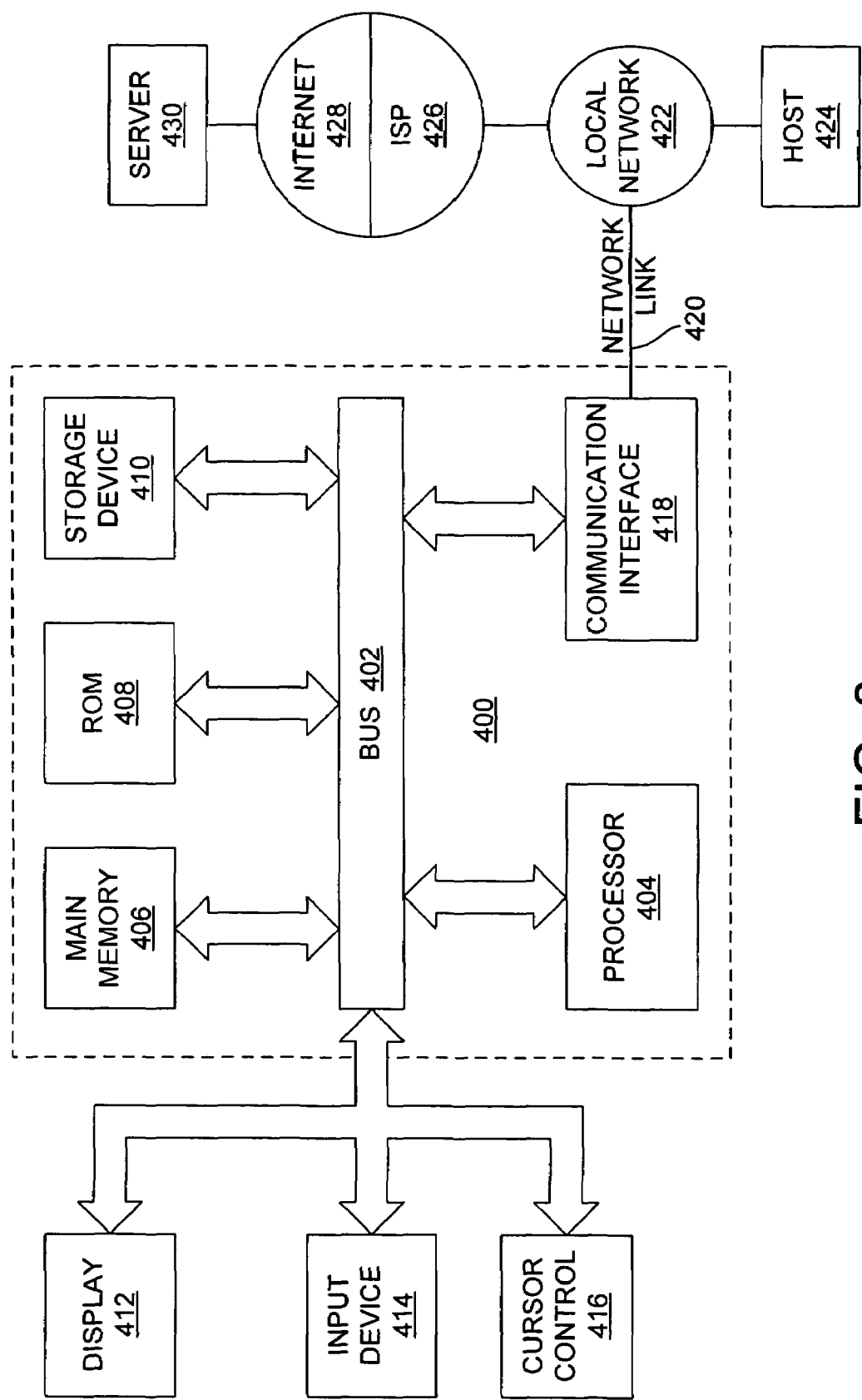
FIG. 8 is a block diagram that depicts a computer system upon which embodiments of the invention may be implemented.

FIG. 8 is a block diagram that depicts a computer system 400 upon which embodiments of the invention may be implemented. Computer system 400 includes a bus 402 or other communication mechanism for communicating information, and a processing entity 404 coupled with bus 402 for processing information. The processing entity 404 may include any number of general purpose and/or special purposes processors co-located within a single computing system or distributed over a network of computing systems. Computer system 400 also includes a main memory 406, such as a random access memory (RAM) or other dynamic storage device, coupled to bus 402 for storing information and instructions to be executed by processing entity 404, including the above described data structures and functions (e.g., the describe functions and table functions, TDO generator functions and QDT generator functions described above and the associated data structures generated, accessed and manipulated by such functions) and instructions to be executed by processing entity 404 to carry out- the above-described operations. Main memory 406 also may be used for storing temporary variables or other intermediate information during execution of instructions to be executed by processing entity 404. Computer system 400 further includes a read only memory (ROM) 408 or other static storage device coupled to bus 402 for storing static information and instructions for processing entity 404. A storage device 410, such as a magnetic disk or optical disk, is provided and coupled to bus 402 for storing information and instructions, such as the functions and data structures described above.

Computer system 400 may be coupled via bus 402 to a display 412, such as a cathode ray tube (CRT), for displaying information to a computer user. An input device 414, including alphanumeric and other keys, is coupled to bus 402 for communicating information and command selections (e.g., the user-specified queries described above) to processing entity 404. Another type of user input device is cursor control 416, such as a mouse, a trackball, or cursor direction keys for communicating direction information and command selections to processing entity 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processing entity 404 executing one or more sequences of one or more instructions contained in main memory 406. Such instructions may be read into main memory 406 from another computer-readable medium, such as storage device 410. Execution of the sequences of instructions contained in main memory 406 causes processing entity 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processing entity 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processing entity 404 for execution. For example, the instructions may initially be carried on a magnetic disk of a remote computer. The remote computer can load the instructions into its dynamic memory and send the instructions over a telephone line or other signaling medium using a modem. A modem local to computer system 400 can receive the data on the signaling medium and use an infra-red transmitter to convert the data to an infra-red signal. An infra-red detector can receive the data carried in the infra-red signal and appropriate circuitry can place the data on bus 402. Bus 402 carries the data to main memory 406, from which processing entity 404 retrieves and executes the instructions. The instructions received by main memory 406 may optionally be stored on storage device 410 either before or after execution by processing entity 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processing entity 404 as it is received, and/or stored in storage device 410, or other non-volatile storage for later execution. In this manner, computer system 400 may obtain application code in the form of a carrier wave.

The section headings in the preceding detailed description are provided for convenience of reference only, and in no way define, limit, construe or describe the scope or extent of such sections. Also, while the invention has been described with reference to specific exemplary embodiments thereof, it will be evident that various modifications and changes may be made thereto without departing from the broader spirit and scope of the invention. The specification and drawings are, accordingly, to be regarded in an illustrative rather than restrictive sense.

What is claimed is:

1. A method of operation within a database system, the method comprising:
   receiving a request to execute a query;
   in response to receiving the request to execute the query, before compiling the query for query execution, performing:
      determining that a collection of data elements to be returned by the query corresponds to a first data structure containing data fields, wherein the data fields are not specified by a data type definition within a type dictionary of the database system;
      obtaining attribute values that respectively describe the data fields within the first data structure; and
      recording, within the type dictionary, a first data type definition that specifies the data fields described by the attribute values; and
   removing the first data type definition from the type dictionary when a particular event occurs, wherein the particular event is an event from a set consisting of a) execution of the query is complete, b) a compilation of the query is deleted from system memory, or c) a process identifies a flag, in the first data type definition, that the first data type definition is a query duration type.

2. The method of claim 1 further comprising recording, within the type dictionary, a second data type definition that defines an array of the first data type.

3. The method of claim 1 wherein obtaining attribute values that describe respective data fields within the first data structure comprises querying a data source to obtain the attribute values.

4. The method of claim 3 wherein querying the data source to obtain the attribute values comprises communicating with a remote processing system via a network of one or more computer systems.

5. The method of claim 1 wherein the first data structure includes rows and columns of data values, and wherein obtaining attribute values that describe respective data fields within the first data structure comprises obtaining a list of column names and column types.

6. The method of claim 1 further comprising determining whether any of the attribute values describes a data field having a plurality of component data fields.

7. The method of claim 6 further comprising obtaining attribute values that describe the plurality of component data fields.

8. The method of claim 1 wherein recording a first data type definition comprises:
   generating a data type name;
   associating the data type name with names of the data fields; and
   recording the data type name and the names of the data fields in the type dictionary.

9. The method of claim 8 wherein generating the data type name comprises incrementing an identifier value associated with a previously generated name, the incremented identifier value constituting, at least in part, the data type name.

10. The method of claim 8 wherein the names of the data fields are included in the attribute values and wherein associating the data type name with the names of the data fields comprises specifying the names of the data fields as component data elements of the first data type definition.

11. The method of claim 1 wherein receiving a request to execute a query comprises receiving a request to execute a function that returns a collection of aggregate data values.

12. The method of claim 1 wherein determining that a collection of data elements to be returned by the query corresponds to a first data structure containing data fields comprises determining that a predetermined return type is indicated by the query.

13. The method of claim 12 wherein the predetermined return type corresponds to an array of aggregate values and indicates that each of the aggregate values includes component values in accordance with the first data structure.

14. A database system comprising:

a processing entity; and a memory coupled to the processing entity and having a dictionary of data type definitions stored therein, and further having program code stored therein which, when executed by the processing entity, causes the processing entity to:

receive a request to execute a query;

in response to receiving the request to execute the query, before compiling the query for query execution, performing:

determining that a collection of data elements to be returned by the query corresponds to a first data structure containing data fields, wherein the data fields are not specified by a data type definition within a type dictionary of the database system;

obtaining attribute values that respectively describe the data fields within the first data structure; and recording, within the type dictionary, a first data type definition that specifies the data fields described by the attribute values; and removing the first data type definition from the type dictionary when one of the following events occurs: a) execution of the query is complete, b) a compilation of the query is deleted from system memory, or c) a process identifies a flag, in the first data type definition, that the first data type definition is a query duration type.

15. The system of claim 14 wherein the processing entity comprises a plurality of processors coupled to one another in a network.

16. The system of claim 15 wherein the memory comprises a plurality of sets of storage devices, each set of storage devices being coupled to at least one of the processors and including at least one non-volatile storage device.

17. A volatile or non-volatile computer-readable medium storing one or more sequences of instructions which, when executed by one or more processors, causes the one or more processors to:

receive a request to execute a query;

in response to receiving the request to execute the query, before compiling the query for query execution, performing:

determine that a collection of data elements to be returned by the query corresponds to a first data structure containing data fields, wherein the data fields are not specified by a data type definition within a type dictionary of the database system;

obtain attribute values that respectively describe the data fields within the first data structure; and record, within the type dictionary, a first data type definition that specifies the data fields described by the attribute values; and remove the first data type definition from the type dictionary when one of the following events occurs: a) execution of the query is complete, b) a compilation of the query is deleted from system memory, or c) a process identifies a flag, in the first data type definition, that the first data type definition is a query duration type.

18. The medium of claim 17 wherein the one or more sequences of instructions further comprise instructions which, when executed by one or more processors, causes the one or more processors to perform recording, within the type dictionary, a second data type definition that defines an array of the first data type.

19. The medium of claim 17 wherein said obtaining attribute values that describe respective data fields within the first data structure comprises querying a data source to obtain the attribute values.

20. The medium of claim 19 wherein said querying the data source to obtain the attribute values comprise communicating with a remote processing system via a network of one or more computer systems.

21. The medium of claim 19 wherein the first data structure includes rows and columns of data values, and wherein obtaining attribute values that describe respective data fields within the first data structure comprises obtaining a list of column names and column types.

22. The medium of claim 17 wherein the one or more sequences of instructions further comprise instructions which, when executed by one or more processors, causes the one or more processors to perform determining whether any of the attribute values describes a data field having a plurality of component data fields.

23. The medium of claim 22 wherein the one or more sequences of instructions further comprise instructions which, when executed by one or more processors, causes the one or more processors to perform obtaining attribute values that describe the plurality of component data fields.

24. The medium of claim 17 wherein said recording a first data type definition comprises:

generating a data type name;

associating the data type name with names of the data fields; and recording the data type name and the names of the data fields in the type dictionary.

25. The medium of claim 24 wherein said generating the data type name comprises incrementing an identifier value associated with a previously generated name, the incremented identifier value constituting, at least in part, the data type name.

26. The medium of claim 24 wherein the names of the data fields are included in the attribute values and wherein associating the data type name with the names of the data fields comprises specifying the names of the data fields as component data elements of the first data type definition.

27. The medium of claim 17 wherein said receiving a request to execute a query comprises receiving a request to execute a function that returns a collection of aggregate data values.

28. The medium of claim 17 wherein said determining that a collection of data elements to be returned by the query corresponds to a first data structure containing data fields comprises determining that a predetermined return type is indicated by the query.

29. The medium of claim 28 wherein the predetermined return type corresponds to an array of aggregate values and indicates that each of the aggregate values includes component values in accordance with the first data structure.

* * * * *

UNITED STATES PATENT AND TRADEMARK OFFICE
CERTIFICATE OF CORRECTION

| | | |
|---|---|---|
| PATENT NO. | : 7,512,599 B2 | Page 1 of 1 |
| APPLICATION NO. | : 10/767501 | |
| DATED | : March 31, 2009 | |
| INVENTOR(S) | : Yu et al. | |

It is certified that error appears in the above-identified patent and that said Letters Patent is hereby corrected as shown below:

In column 1, line 58, delete "modem" and insert -- modern --, therefor.

In column 5, line 47, after "TDO" insert -- is --.

In column 5, line 53, above "Note" delete "is".

In column 12, line 1, delete "out- the" and insert -- out the --, therefor.

Signed and Sealed this

Eighth Day of June, 2010

David J. Kappos
*Director of the United States Patent and Trademark Office*